US008682797B1

(12) United States Patent
Karp et al.

(10) Patent No.: US 8,682,797 B1
(45) Date of Patent: Mar. 25, 2014

(54) METHODS AND SYSTEMS FOR DISTRIBUTING DIGITALLY ENCODED INFORMATION

(75) Inventors: Alan H. Karp, Palo Alto, CA (US); Antonius A. Kalker, Carmel, CA (US)

(73) Assignee: Hewlett-Packard Developmenet Company, L.P., Houston, TX (US)

( * ) Notice: Subject to any disclaimer, the term of this patent is extended or adjusted under 35 U.S.C. 154(b) by 1452 days.

(21) Appl. No.: 11/796,306

(22) Filed: Apr. 27, 2007

(51) Int. Cl.
*G06F 21/10* (2013.01)

(52) U.S. Cl.
USPC .................................. 705/52; 705/50; 705/75

(58) Field of Classification Search
USPC ....................................................... 705/1, 76
See application file for complete search history.

(56) References Cited

U.S. PATENT DOCUMENTS

| | | | | |
|---|---|---|---|---|
| 6,226,618 B1 * | 5/2001 | Downs et al. | ..................... | 705/1 |
| 6,741,991 B2 * | 5/2004 | Saito | ................................. | 707/9 |
| 6,978,020 B2 * | 12/2005 | Taniguchi et al. | ............ | 380/201 |
| 7,263,497 B1 * | 8/2007 | Wiser et al. | ..................... | 705/26 |
| 7,590,866 B2 * | 9/2009 | Hurtado et al. | ................ | 713/189 |
| 2002/0059238 A1 * | 5/2002 | Saito | ................................. | 707/9 |
| 2003/0023551 A1 * | 1/2003 | Brown et al. | ................... | 705/40 |
| 2003/0163684 A1 * | 8/2003 | Fransdonk | ..................... | 713/153 |
| 2004/0187005 A1 * | 9/2004 | Molaro | .......................... | 713/176 |
| 2006/0173794 A1 * | 8/2006 | Sellars et al. | ................... | 705/76 |
| 2006/0178902 A1 * | 8/2006 | Vicars et al. | ..................... | 705/1 |
| 2007/0276928 A1 * | 11/2007 | Rhoads et al. | ................ | 709/219 |

* cited by examiner

*Primary Examiner* — Evens J Augustin

(57) ABSTRACT

Various embodiments of the present invention are directed to methods and systems for distributing digitally encoded information. In one embodiment of the present invention, a licensee desiring to purchase digitally encoded information from a copyright owner posts collateral with a third party entity. The third party entity then provides authentication information to the licensee. The licensee transmits proof of knowledge of authentication information to the copyright owner. The copyright owner sends proof of the licensee's knowledge of authentication information and digital media to the third-party entity. The third-party entity embeds the authentication information in the digitally encoded information, and delivers the digitally encoded information with embedded authentication information to the licensee.

11 Claims, 5 Drawing Sheets

METHODS AND SYSTEMS FOR DISTRIBUTING DIGITALLY ENCODED INFORMATION

TECHNICAL FIELD

The present invention relates to digital rights management systems, and, in particular, to posting collateral in conjunction with a digital rights management system to distribute digitally encoded information.

BACKGROUND OF THE INVENTION

Copyright is a type of intellectual property right held by authors of original, creative works, such as songs, movies, and software. A copyright owner may sell copies of an original work, or sell a license authorizing others to reproduce, distribute, prepare derivative works, and publicly perform a copyrighted work for a limited term. A license is a copyright owner's authorization to use a copyrighted work.

Copyright law distinguishes the ownership of a copy of a copyrighted work, such as a print of a photograph, a song on compact disk ("CD"), or a book, from ownership of the copyright. Purchasing or possessing a copy of a copyrighted work does not give the owner of the copy the rights held by the copyright owner. For example, purchasing a sound recording does not give the owner of the copy of the sound recording permission to make copies of the sound recording and sell or otherwise distribute the copies.

In recent years, the advent of personal computers, the Internet, and popular file-sharing tools have made possible unauthorized sharing of copyrighted works stored as digitally encoded information ("digital piracy"). Copyrighted works stored as digitally encoded information can be copied and distributed almost an unlimited number of times without degrading the quality of the subsequent copies.

Digital Rights Management ("DRM") is one means by which copyright owners and digitally encoded information distributors have tried to control digital piracy and maintain control over copyrighted works. DRM includes technologies to prevent digital piracy during digitally encoded information transfer by enforcing additional restrictions beyond the existing restrictions imposed by copyright law. However, software has been developed which allows users of copyrighted works in digital form to circumvent DRM technologies. For example, FairUse4WM allows users to strip Windows Media Player® of DRM restrictions and is readily available over the Internet. Although the Digital Millennium Copyright Act of 1998 ("DMCA") attempts to address the problem of digital piracy by prohibiting the sale, manufacture, and marketing of products, such as FairUse4WM, the provisions of the DMCA are not often enforced.

DRM technologies are used by Internet music stores to restrict the usage of music purchased and downloaded online. One example is Apple's iTunes Store® ("iTS"). Copies of songs purchased from the iTS are copyright-protected with Apple's FairPlay® DRM system. Apple's FairPlay® DRM system includes encoding each song in an Advanced Audio Coding ("AAC") format. The AAC format is supported by iPods and is not compatible with many other music devices, thus limiting the number of computers which may simultaneously play purchased tracks. However, tracks can be copied to an unlimited number of iPods, allowing loaded iPods to be sold on online auction houses, such as eBay. Purchased tracks can also be copied to conventional music CDs in Compact Disc Digital Audio ("CDDA") format without any copyright restrictions transferred to the CD. Various programs can read and convert tracks from a CD to other music formats, such as Moving Picture Experts Group-1 Audio Layer 3 ("MP3"), that are used by competing digital music players, allowing multiple users access to purchased songs. Yahoo! Music Unlimited® ("YMU") is a subscription service for online music connected to the Yahoo! Music Jukebox®. Users access YMU by providing a user identification ("ID") and a password, which enables simultaneous use on three different computers, in an effort to allow users to access YMU on multiple devices. However, users may engage in digital piracy by sharing user IDs and passwords.

Hardware tokens have been developed to address some of the attempts to circumvent DRM technology. A hardware token, such as a smartcard or a pocket-sized integrated circuit card with embedded circuits, may be used to prove that a user is authorized to use digital media. Hardware tokens are often small devices that may store cryptographic keys, digital signatures, or biometric data, such as a fingerprint, that facilitate user authentication. However, hardware tokens may be cumbersome for users to carry, and often involve costly special-purpose hardware. Accordingly, copyright holders and digitally encoded information distributors have recognized a need for tools to prevent digital piracy and to encourage users to comply with the limited rights of use given by a license.

SUMMARY OF THE INVENTION

Various embodiments of the present invention are directed to methods and systems for distributing digitally encoded information. In one embodiment of the present invention, a licensee desiring to purchase digitally encoded information from a copyright owner posts collateral with a third party entity. The third party entity then provides authentication information to the licensee. The licensee transmits proof of knowledge of authentication information to the copyright owner. The copyright owner sends proof of the licensee's knowledge of authentication information and digital media to the third-party entity. The third-party entity embeds the authentication information in the digitally encoded information, and delivers the digitally encoded information with embedded authentication information to the licensee.

DETAILED DESCRIPTION OF THE INVENTION

Various embodiments of the present invention are directed to methods and systems for distributing digitally encoded information, including methods for distributing digitally encoded information through the verification of user authentication information. A potential licensee may seek to obtain a copy of digitally encoded information, such as a song, movie, software, photograph, television program, recorded spoken word, or copyrighted document. In one embodiment of the present invention, the potential licensee makes a request for a license to obtain the digitally encoded information from a content owner, such as a copyright owner, digital media distributor, or a third party representing the actual copyright owner. The content owner relies on a third-party entity to collect collateral from the potential licensee in order to ensure that the potential licensee does not violate the license provided to the potential licensee, along with the digitally encoded information. In general, the collateral is returned to the licensee on the condition that the licensee has not violated the license for some period of time. In alternative embodiments of the present invention, the content owner may perform the functions of the third-party entity. In further alternative embodiments of the present invention, the functions of the third-party entity may be performed by one or more entities.

Figure 1:
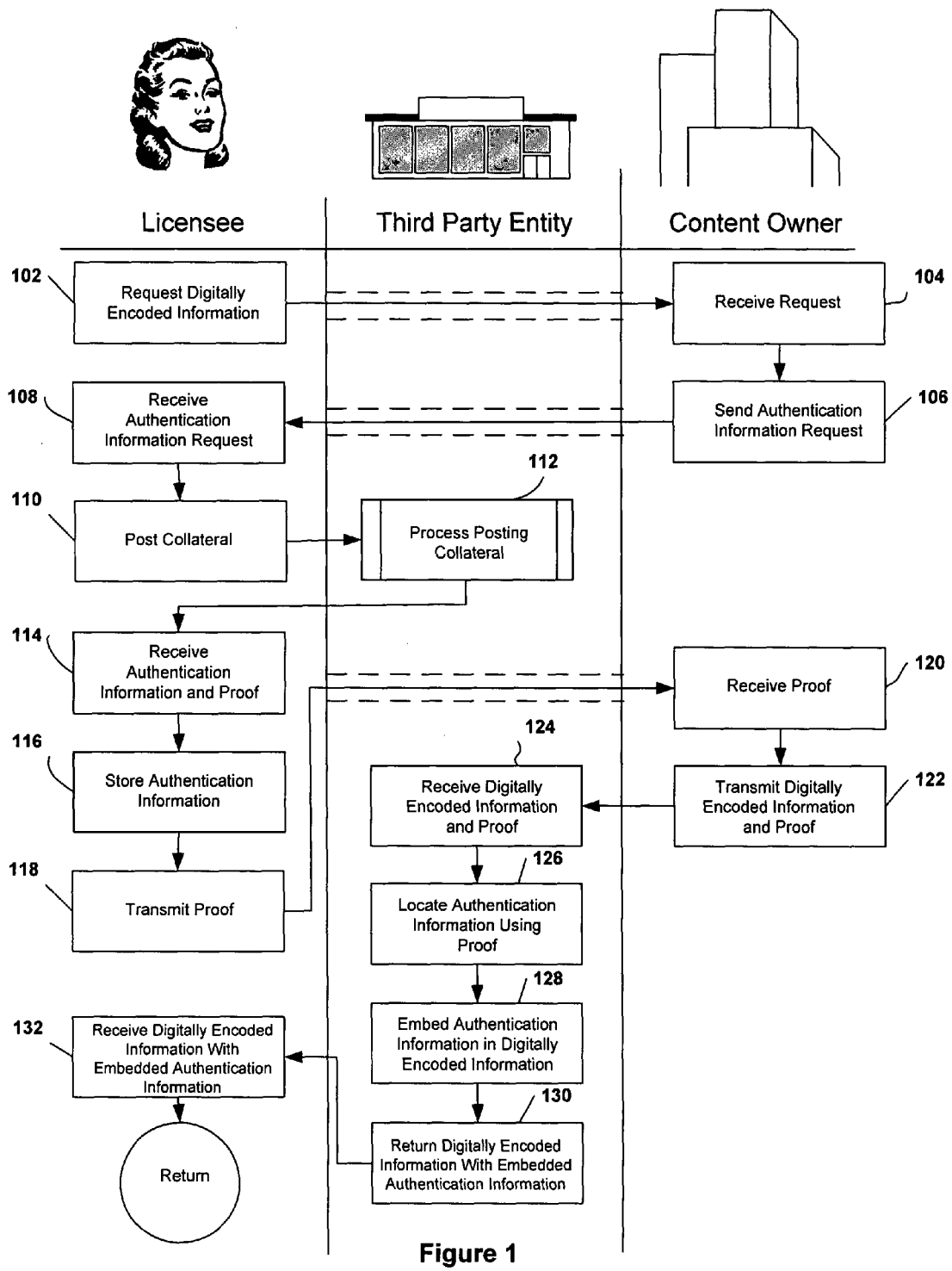
FIG. 1 is a control-flow diagram illustrating a first method for distributing digitally encoded information that represents one embodiment of the present invention.

FIG. 1 is a control-flow diagram illustrating a first method for distributing digitally encoded information that represents one embodiment of the present invention. In FIG. 1, a licensee obtains digitally encoded information from a content owner through a third-party entity. In step 102, a potential licensee requests digitally encoded information from the content owner, such as rights to one or more songs, movies, software, photographs, television programs, recorded spoken word, and copyrighted documents. The potential licensee may seek to obtain the digitally encoded information through either an exclusive license, or a nonexclusive license to become a licensee. The license may specify the material to be licensed, the specific rights to be licensed, and within what limits the rights may be exercised. In alternative embodiments of the present invention, the digitally encoded information may be sensitive information intended only for the licensee. In further alternative embodiments of the present invention, the digitally encoded information may be presented to the licensee in hardcopy form or softcopy form.

In step 104, the content owner receives the request for digitally encoded information from the potential licensee. In step 106, the content owner sends an authentication information request to the potential licensee. In step 108, the potential licensee receives the authentication information request from the content owner.

In step 110, the potential licensee posts collateral with the third-party entity. For example, the potential licensee allows the third-party entity to place a hold on the licensee's credit card or bank account, or the potential licensee gives the third-party entity a cash payment. In alternative embodiments of the present invention, the potential licensee may use an additional third party to assume the risk involved in the potential licensee providing the collateral. The additional third party may function in a way similar to an insurance company, or a bail bondsman.

In step 112, the third-party entity processes the posting of collateral, as described below with reference to FIG. 3. In step 114, the potential licensee receives authentication information and proof of the authentication information from the third-party entity. For example, the third-party entity may specify a secret, such as a password, that corresponds to a user ID.

In step 116, the potential licensee stores the authentication information. In step 118, the potential licensee transmits proof of the authentication information to the content owner. In step 120, the content owner receives proof of the authentication information from the potential licensee, and the potential licensee becomes a licensee. Proof of the licensee's knowledge of the authentication information may be through delivering the authentication information itself, or through the use of zero-knowledge protocols ("ZKPs") so that the content owner does not learn the authentication information itself.

ZKPs allow a prover ("P") to convince a verifier ("V") of P's knowledge of a certain secret without disclosing any information except the validity of P's claim. By limiting the amount of information transferred between the licensee and the content owner, a ZKP may prevent eavesdroppers from obtaining the authentication information when the licensee seeks to prove knowledge of the authentication information to the content owner. The licensee may prove knowledge of authentication information, such as a password, to the content owner by responding correctly to questions that require knowledge of the authentication information to answer. For example, the licensee may prove to the content owner that the licensee has been given the correct authentication information through answering questions related to a given password, such as the number of characters the password is composed of.

In step 122, the content owner transmits the digitally encoded information and proof of the licensee's knowledge of the authentication information to the third-party entity. For example, the content owner delivers a song and proof that the licensee knows the correct password to the third-party entity. In step 124, the third-party entity receives the digitally encoded information and proof of the licensee's knowledge of the authentication information.

In step 126, the third-party entity locates the authentication information using the proof of the licensee's knowledge of the authentication information. In step 128, the third-party entity embeds the authentication information in the digitally encoded information. For example, the third-party entity embeds the authentication information into the digitally encoded information through digital watermarking ("watermarking"). The authentication information may identify the licensee, allowing subsequent copies produced through digital piracy to be traced to the licensee. In an alternative embodiment of the present invention, information related to the content owner and authentication information identifying the licensee may be embedded into the digitally encoded information.

Watermarking is the process of inserting a pattern of bits into digitally encoded information that identifies related copyright information, such as the author or the original licensee of the digital media. Unlike printed watermarks, such as printed watermarks found on stationary to identify the manufacturer of the stationary, digital watermarks ("watermarks") are typically intended to be non-detectable. The bits inserted into the digital media are commonly scattered throughout the file to avoid detection and manipulation. Watermarking may be performed without the licensee's knowledge, allowing the licensee to be identified in subsequent copies of the digitally encoded information.

Copies of digitally encoded information containing a watermark produced through digital piracy may be traced without the loss of quality of the digitally encoded information. Watermarks are often robust to some reasonable distortions during storage and transmission, such as compression, noise addition, format conversion, and bit errors. Watermarks are often also robust to some artifacts caused by signal processing operations, such as noise reduction, filtering, sharpening, and color and intensity variations. Copyright information may be extracted from digitally watermarked ("watermarked") digitally encoded information if the origin of the digitally encoded information is in question.

Licensees engaged in digital piracy may attempt to remove the watermark. However, erasing the watermark or replacing the watermark by another watermark is often technically difficult.

In step 130, the third-party entity returns digitally encoded information with embedded authentication information to the licensee. In step 132, the licensee receives the digitally encoded information with embedded authentication information.

Figure 2A:
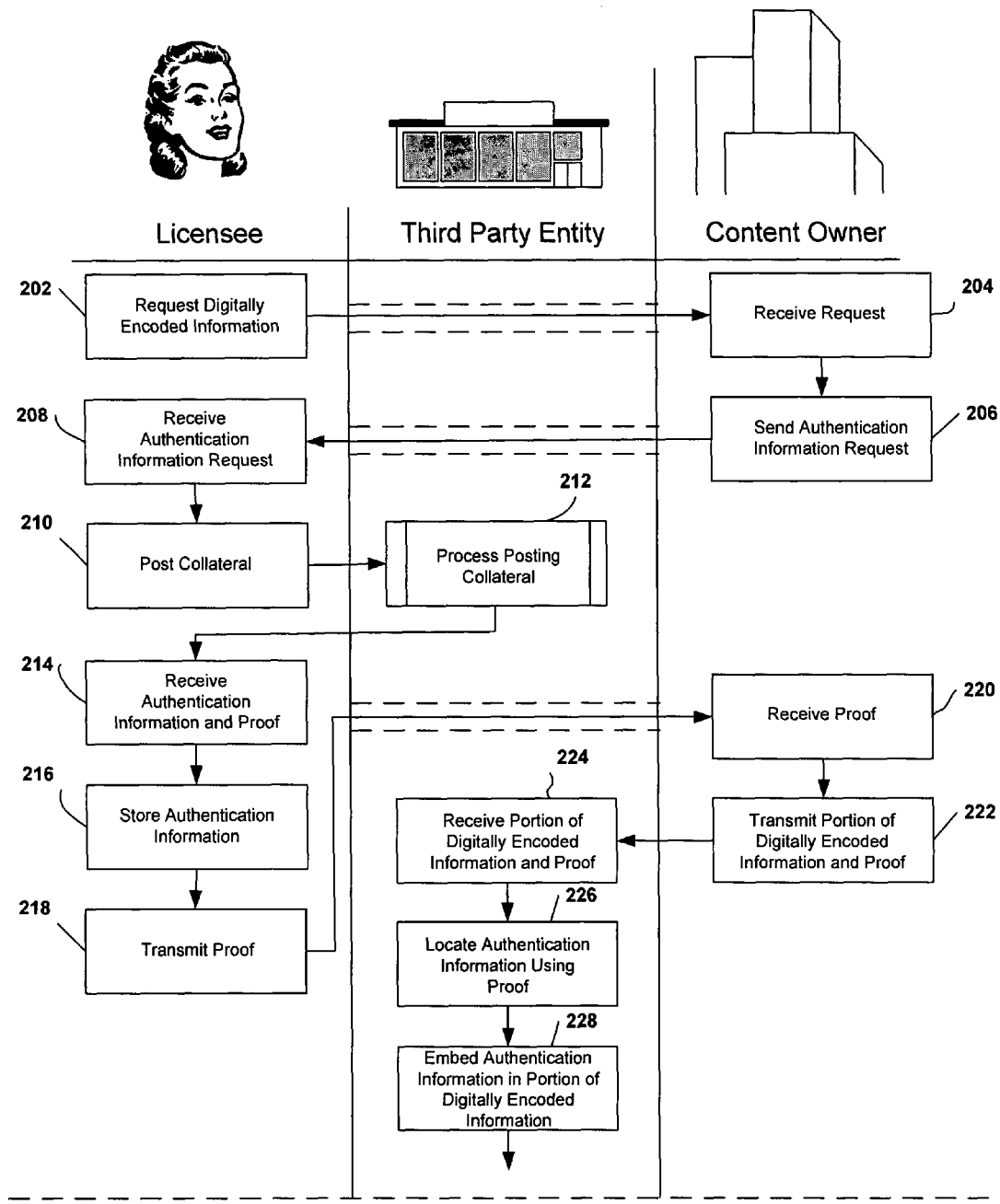
FIGS. 2A-2B are control-flow diagrams illustrating a second method for distributing digitally encoded information that represents one embodiment of the present invention.
Figure 2B:
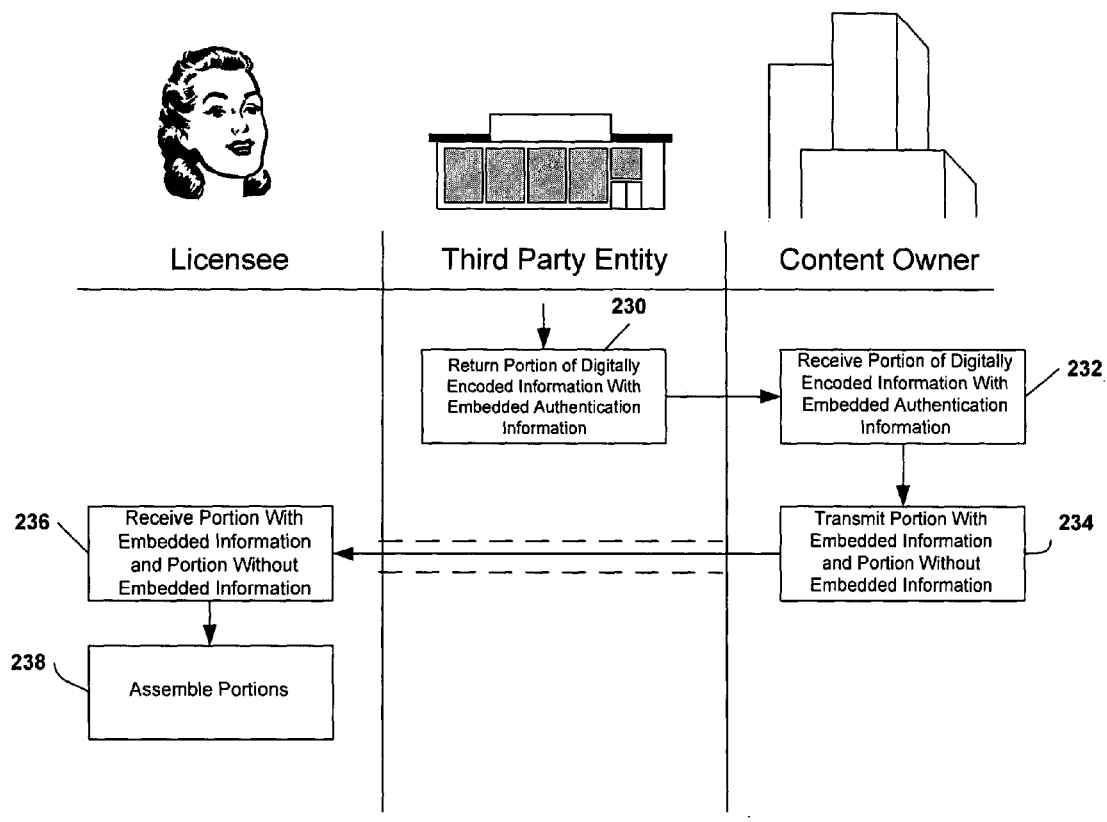

FIGS. 2A-2B are control-flow diagrams illustrating a second method for distributing digitally encoded information that represents one embodiment of the present invention. Steps 202 through 220 are similar to those described above, with reference to FIG. 1. Subsequent steps differ from those described above, with reference to FIG. 1. The content owner transmits a portion of the digitally encoded information to the third-party entity for embedding authentication information, rather than transmitting all of the digitally encoded information.

In step 222, the content owner transmits a portion of the digitally encoded information and proof of the licensee's knowledge of the authentication information to the third-party entity. In step 224, the third-party entity receives the portion of the digitally encoded information and proof of the licensee's knowledge of the authentication information.

In step 226, the third-party entity locates the authentication information using the proof of the licensee's knowledge of the authentication information. In step 228, the third-party entity embeds the authentication information in the portion of the digitally encoded information. In step 230, the third-party entity returns the portion of the digitally encoded information with embedded authentication information to the content owner. In step 232, the licensee receives the digitally encoded information with embedded authentication information.

In step 234, the content owner transmits the portion of the digitally encoded information with embedded authentication information and a portion of the digitally encoded information without embedded information to the licensee. In step 236, the licensee receives the portion of the digitally encoded information with embedded authentication information and the portion of the digitally encoded information without embedded information.

In step 238, the licensee assembles the portion of the digitally encoded information with embedded authentication information and the portion of the digitally encoded information without embedded information. For example, the licensee may assemble the portions through the use of software.

Figure 3:
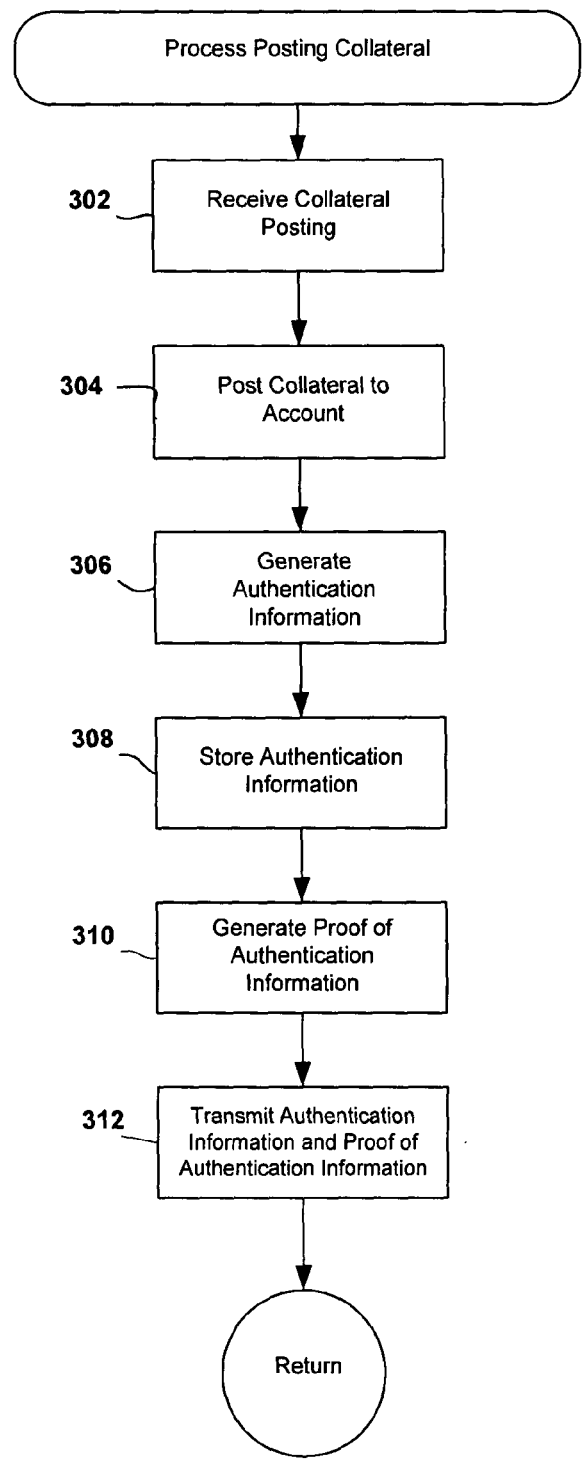
FIG. 3 is a control-flow diagram illustrating a routine "process posting collateral" that represents one embodiment of the present invention.

FIG. 3 is a control-flow diagram illustrating a routine "process posting collateral" that represents one embodiment of the present invention. In step 302, a third-party entity receives a collateral posting from a licensee. In step 304, collateral is posted to the third-party entity's account. In step 306, authentication information is generated. In step 308, the authentication information is stored. In step 310, proof of authentication information is generated. In step 312, the authentication information and the proof of authentication information is transmitted.

Figure 4:
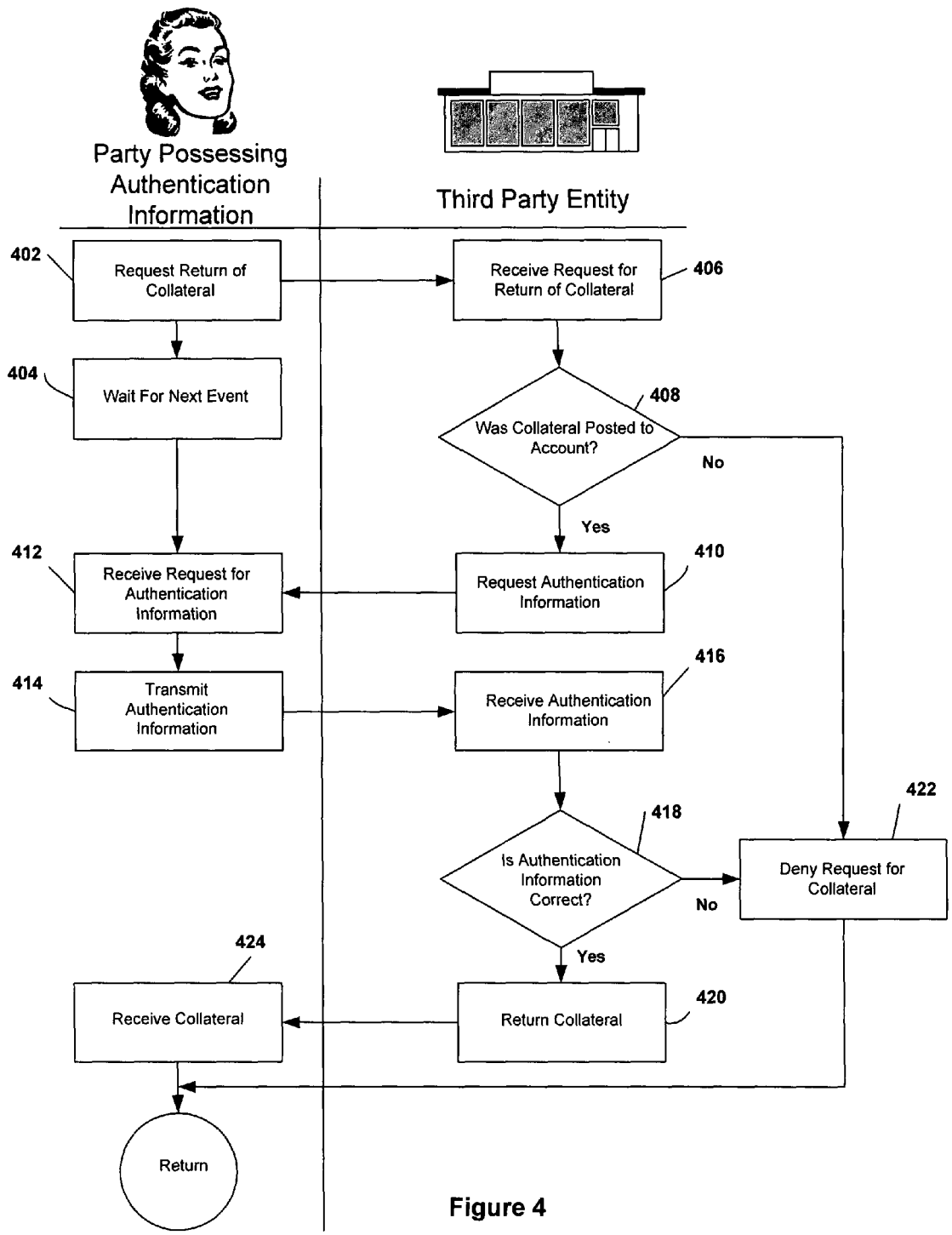
FIG. 4 is a control-flow diagram illustrating a method for returning collateral that represents one embodiment of the present invention.

FIG. 4 is a control-flow diagram illustrating a method for returning collateral that represents one embodiment of the present invention. In step 402, a party possessing authentication information requests the return of collateral from a third-party entity. For example, a licensee may retrieve a cash payment posted as collateral after specifying a password that corresponds to a user ID. The collateral may be retrieved by any entity having access to the authentication information. Third parties who have accessed the digitally encoded information through digital piracy may have access to the authentication information, and may retrieve the collateral. In step 404, there is a time for the party possessing authentication information to wait for the next event.

In step 406, the third-party entity receives the request for return of collateral. In step 408, when collateral has been posted to the third-party entity's account, control passed to step 410, otherwise, control passes to step 422. In step 410, the licensee requests authentication information from the party possessing authentication information. In step 412, the party possessing authentication information receives the request for authentication information. In step 414, the party possessing authentication information transmits authentication information to the third-party entity. In step 416, the third-party entity receives the authentication information.

In step 418, when authentication information is correct, control passes to step 420, otherwise, control passes to step 424. In step 420, the collateral is returned to the party possessing authentication information. In step 422, the request for return of collateral is denied. In step 424, the party possessing the authentication information receives the collateral.

Additional modifications within the spirit of the invention will be apparent to those skilled in the art. In an alternative embodiment of the present invention, the licensee may not retrieve the collateral from the third-party entity for 30-90 days to discourage making multiple requests for digitally encoded information. In further alternative embodiments of the present invention, the collateral redeemed by a licensee is reduced by a percentage, or an amount proportional to the value of digitally encoded information.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method, carried out within a computer system, for providing intermediary services to a content owner to facilitate digitally encoded information distribution by a computer of a content distributor, the method comprising:
   receiving, by the computer system, a collateral posting request;
   posting, by the computer system, collateral of the collateral posting request to an account;
   generating, by the computer system, authentication information;
   embedding, by the computer system, the authentication information in digitally encoded information; and
   forwarding, by the computer system, the digitally encoded information to licensees.

2. The method of claim 1 further comprising:
   storing the authentication information;
   generating proof of the authentication information; and
   transmitting the authentication information and the proof of the authentication information.

3. The method of claim 1 wherein forwarding digitally encoded information to a licensee comprises:
receiving the digitally encoded information and additionally receiving proof of authentication information; and
returning the digitally encoded information with embedded authentication information.

4. The method of claim 1 wherein the digitally encoded information is one of:
a song;
a movie;
software;
a photograph;
a television program;
recorded spoken word;
a copyrighted document; and
sensitive information.

5. The method of claim 1 further comprising processing proof-embedding requests.

6. The method of claim 5 wherein processing a proof-embedding request further comprises:
receiving a portion of digitally encoded information and additionally receiving proof of authentication information;
embedding authentication information in the portion of digitally encoded information; and
returning the portion of digitally encoded information with embedded authentication information.

7. A system, implemented on one or more electronic computer systems, for providing intermediary services, the system comprising:
hardware, including a processor and a memory,
wherein the memory stores one or more computer programs executable by the processor to implement a plurality of services comprising:
a collateral-receiving-and-posting service that receives a collateral posting request, posts collateral of the collateral posting request to an account, and generates authentication information;
a digitally-encoded-information-embedding service that embeds the authentication information in digitally encoded information; and
a posting-collateral-return service.

8. The system of claim 7 wherein the collateral-receiving-and-posting service:
stores the authentication information;
generates proof of the authentication information; and
transmits the authentication information and the proof of the authentication information.

9. The system of claim 7 wherein the digitally-encoded-information-embedding service:
receives the digitally encoded information and proof of the authentication information; and
transmits the digitally encoded information with embedded authentication information.

10. The system of claim 9 wherein the digitally encoded information is one of:
a song;
a movie;
software;
a photograph;
a television program;
recorded spoken word;
a copyrighted document; and
sensitive information.

11. The system of claim 7 wherein the posting-collateral-return service:
receives a request for return of collateral;
requests authentication information;
receives the authentication information; and
returns the collateral.

* * * * *

UNITED STATES PATENT AND TRADEMARK OFFICE
CERTIFICATE OF CORRECTION

PATENT NO.      : 8,682,797 B1  
APPLICATION NO. : 11/796306  
DATED           : March 25, 2014  
INVENTOR(S)     : Alan H. Karp et al.

Page 1 of 1

It is certified that error appears in the above-identified patent and that said Letters Patent is hereby corrected as shown below:

Title Page, Item (73), Assignee, in column 1, line 1, delete "Developmenet" and insert
-- Development --, therefor.

Signed and Sealed this
Fifteenth Day of July, 2014

Michelle K. Lee
*Deputy Director of the United States Patent and Trademark Office*